Aug. 28, 1934.  H. L. STEEL  1,971,540
SOIL PULVERIZER
Filed June 26, 1933  2 Sheets-Sheet 1
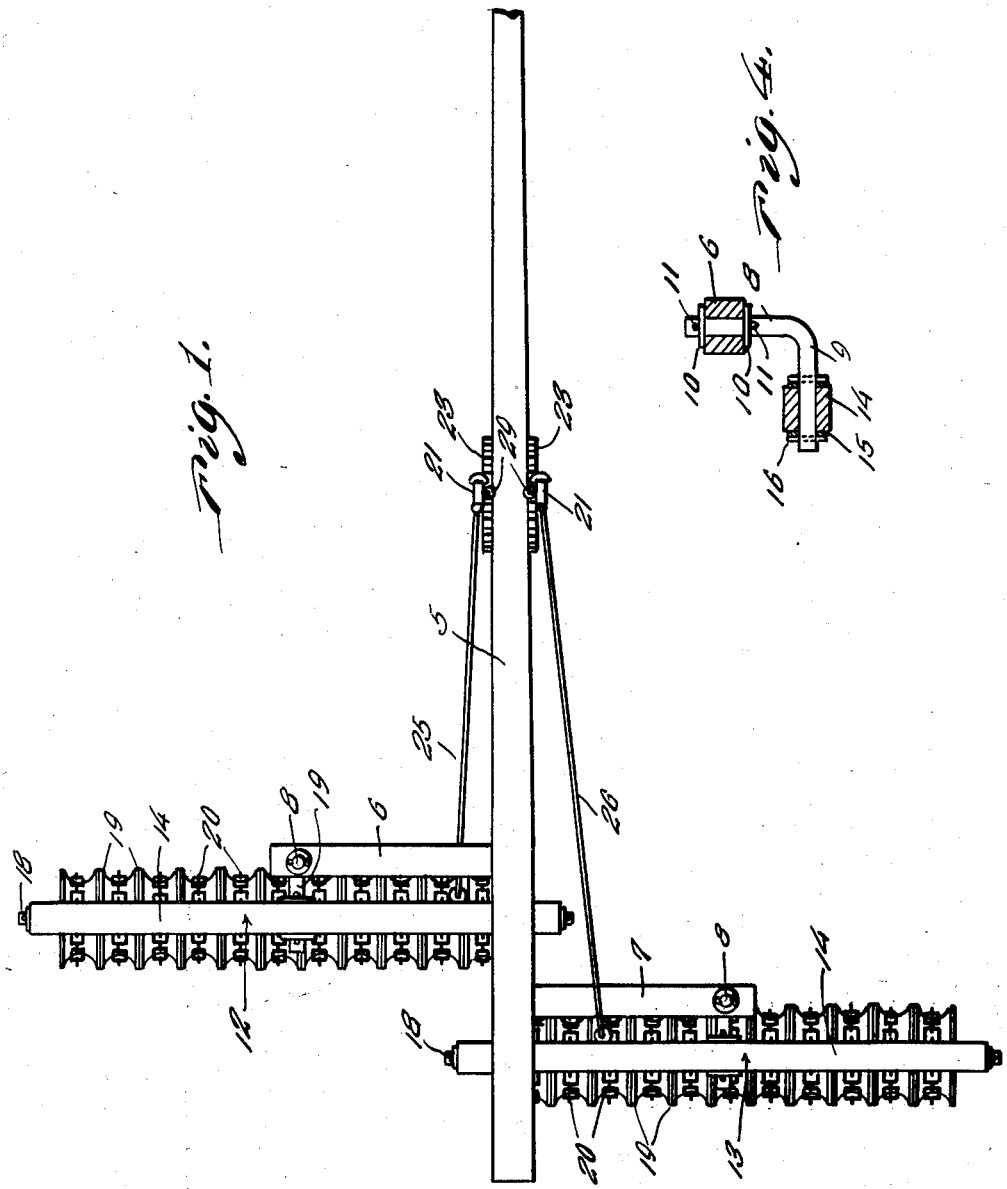

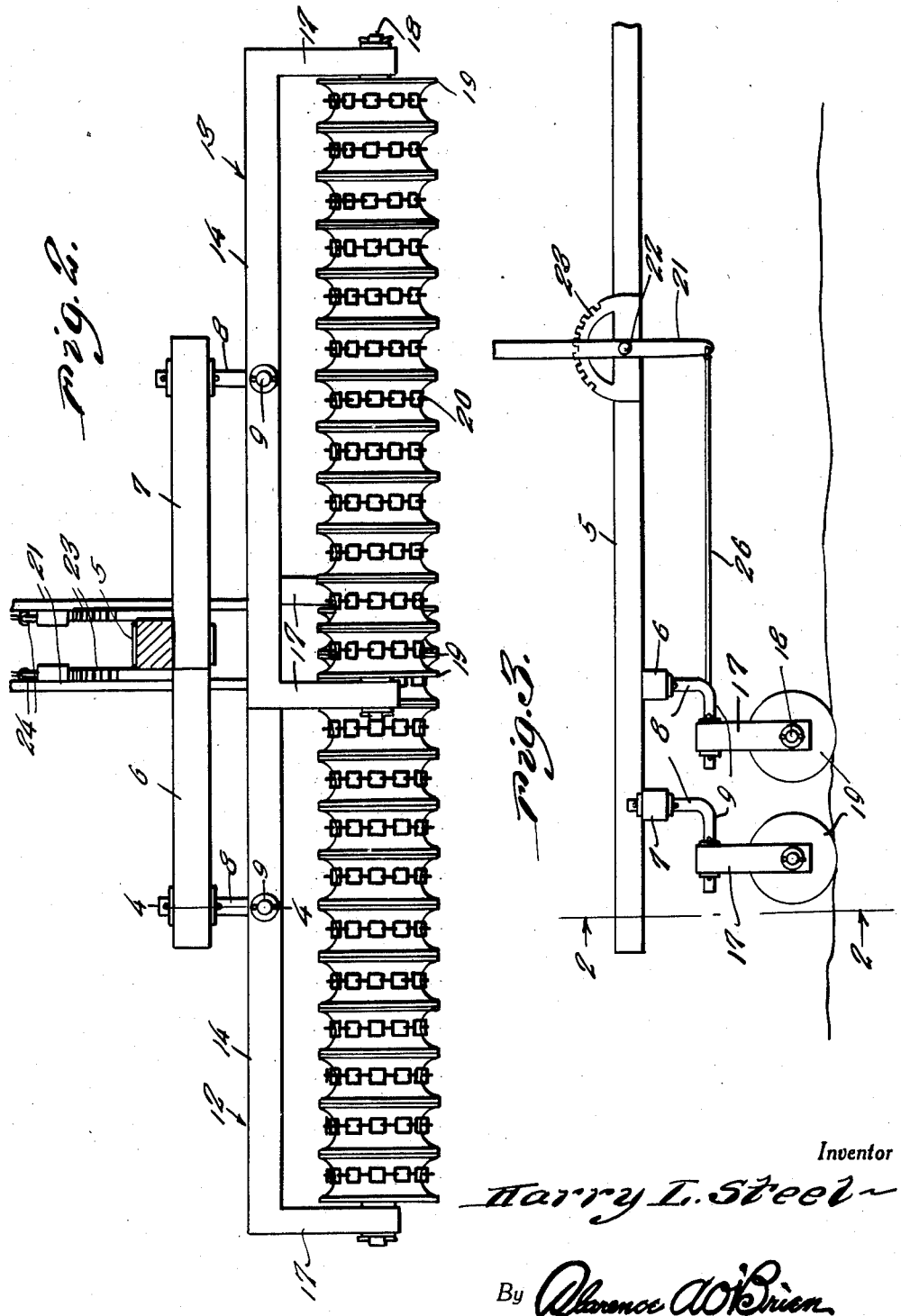

Patented Aug. 28, 1934

1,971,540

UNITED STATES PATENT OFFICE 1,971,540

SOIL PULVERIZER

Harry L. Steel, La Fayette, Ind.

Application June 26, 1933, Serial No. 677,722

2 Claims. (Cl. 55—77)

This invention relates to devices for pulverizing soil and has as its object the provision of such a device which may be readily hitched to a tractor or any other suitable draft means, and which is characterized by a novel arrangement and mounting of gangs of pulverizing wheels which gives to the device a flexibility enabling a ready angular adjustment of the gangs with respect to the line of draft, as well as also permitting the pulverizing disks or wheels to be maintained in operative ground engaging position regardless of the rise and fall of the ground level.

The invention together with its numerous objects and advantages will be best understood from a study of the following description taken in connection with the accompanying drawings wherein is illustrated a preferred embodiment of the invention.

It is to be understood at the outset that it is in no wise intended to restrict the invention to the precise details of construction, combination and arrangement of elements as herein specifically illustrated and described, other than may be necessary to meet the requirements of the prior art and scope of the appended claims.

In the drawings:

Figure 1 is a top plan view of the device.

Figure 2 is a view partly in section, partly in elevation, taken in the plane of the vertical line 2—2 of Figure 3.

Figure 3 is a side elevational view of the device.

Figure 4 is a sectional view taken substantially on the line 4—4 of Figure 2.

Referring to the drawings by reference numerals it will be seen that the device comprises a draft tongue 5 provided adjacent its rear end with lateral bars 6, 7 projecting from the tongue 5 in reverse directions and as will be noted, the bar 6 is arranged in advance of the bar 7.

Each of the bars 6, 7 has journalled in the free end thereof a vertical rod 8 that is provided at its lower end with an integral lateral axle 9. For rotatably retaining the rod or shank 8 in engagement with its bars 6, 7, there are provided upper and lower washers 10 and pins 11 as clearly shown in Figure 4. Swingably supported by the ends 9 of the shanks 8 are inverted U-shaped frames 12, 13 and each of these frames 12, 13 has its horizontal bar 14 provided with an aperture intermediate its ends for receiving the end 9 of a shank 8. To retain the bar 14 of the frame on the shank end 9 there are provided washers 15 and pins 16 as will be clear from a study of Figure 4. Each of the aforementioned frames 12, 13 has depending from its bar 14 side bars 15 in the lower ends of which are journalled the ends of an axle 18. Arranged on the axle 18 is a gang or series of pulverizing wheels or disks 19, each of which is provided on its periphery with a circumferentially extending, substantially V-shaped groove in which is arranged an endless clod-crushing element, the latter being in the present instance a chain 20 of suitable structure. The purpose of the chains 20 is to assist the pulverizing wheels in grounding the clods of earth to relatively small particles.

For varying the angles of the pulverizing gangs with respect to the line of draft there is provided on each side of the tongue 5 an operating lever 21 pivoted as at 22, a segment 23, and a detent 24 carried by the lever 21 and cooperable with the rack segment 23 for holding the lever at the desired adjustment. The lever 21 on one side of the tongue 5 is connected with the frame bar 14 of the gang 12 through the medium of a link 25 while the lever 21 on the opposite side of the tongue is similarly connected to the frame bar of the gang 13 by a link 26.

From the above detailed description it will be seen that the frames 12, 13 are so mounted as to permit a tilting thereof about the ends 9 of the respective shanks 8 in a manner to compensate for unevenness in the ground level so that the periphery of the pulverizing wheels will at all time be in operative engagement with the surface of the ground. Further by oscillating the levers 21 the frames 12, 13 can be oscillated back and forth, the shanks 8 revolving within the apertures provided therefor in the bars 6, 7 and by so manipulating the gangs a cutting of the lumps or clods of earth will be effected by the pulverizing disks. Further, the chains 20 loosely arranged in the grooves of the wheels aid in completely pulverizing the smaller clods of earth and also at the same time aid in the killing of all small weeds.

It will be further noted that when the gangs are arranged at substantially right angles to the line of travel the innermost wheels of the gangs are arranged substantially one behind the other so as to insure against leaving an intermediate portion of the ground being traversed by the device unpulverized. It will also be noted that the gangs of pulverizing wheels are operable independently one of the other and an adjsutment of one gang may be made without effecting the position of the other.

Having thus described my invention, what I claim as new is:

1. In a pulverizer of the class described, a tongue, rigid bars extending laterally from the tongue in reverse directions, said bars being secured at one end to the tongue at relatively spaced points lengthwise of the tongue, a vertical rod journalled in each of the lateral bars, said rod having its free end disposed at substantially a right angle to the rod, an inverted U-shaped frame pivotally mounted intermediate its ends on the last named end of the bar, a gang of pulverizing wheels mounted in each of said frames, levers pivotally mounted on the tongue at opposite sides thereof, a rack bar on the tongue in operative position to each of said levers, a detent on each lever cooperable with the rack bar for securing the lever at the desired adjustment, and links operatively connecting the levers with said frames.

2. In a pulverizer of the character described, a pulverizing wheel provided on its periphery with a circumferentially extending, substantially V-shaped groove, and an endless chain arranged within said groove as and for the purpose specified.

HARRY L. STEEL.